Dec. 19, 1939.   E. W. McKINNEY   2,183,969
PROCESS FOR STRETCHING SHEET METAL
Filed Oct. 10, 1936   10 Sheets-Sheet 1
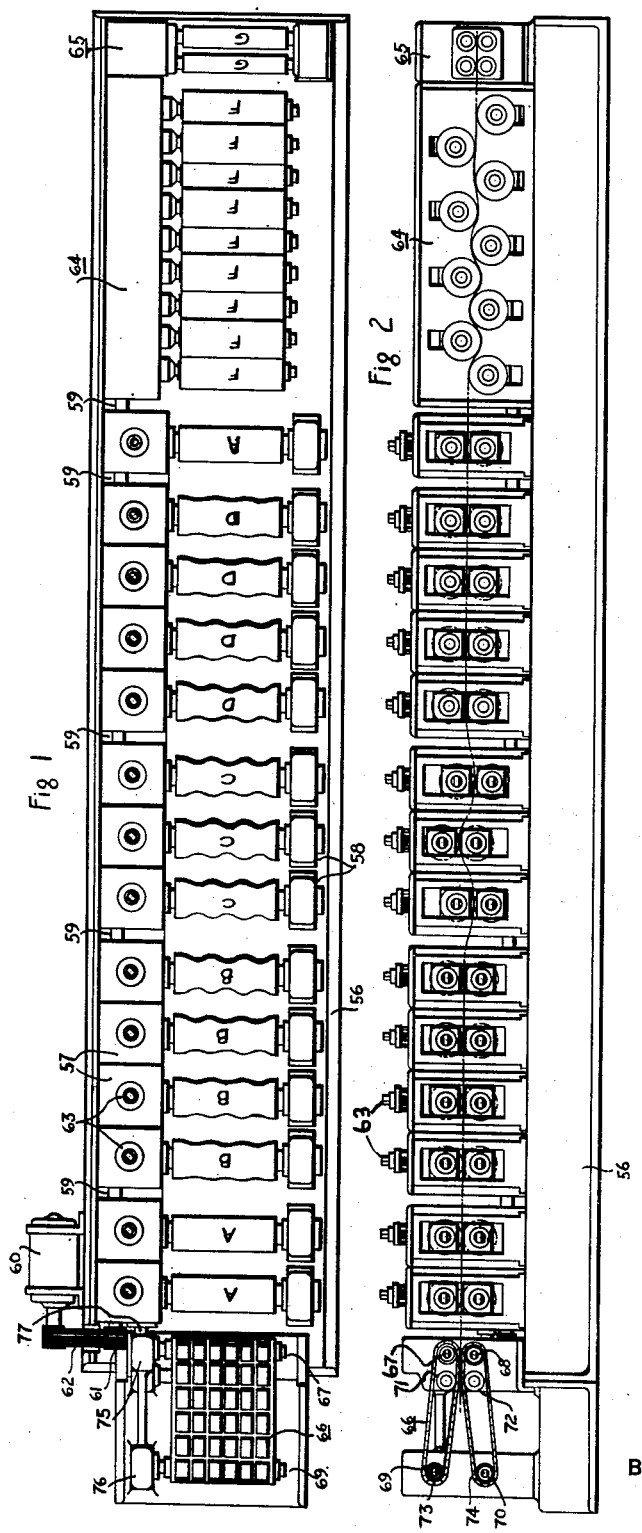
INVENTOR
ELSMERE W. McKINNEY
BY Hoodling and Krost
ATTORNEY

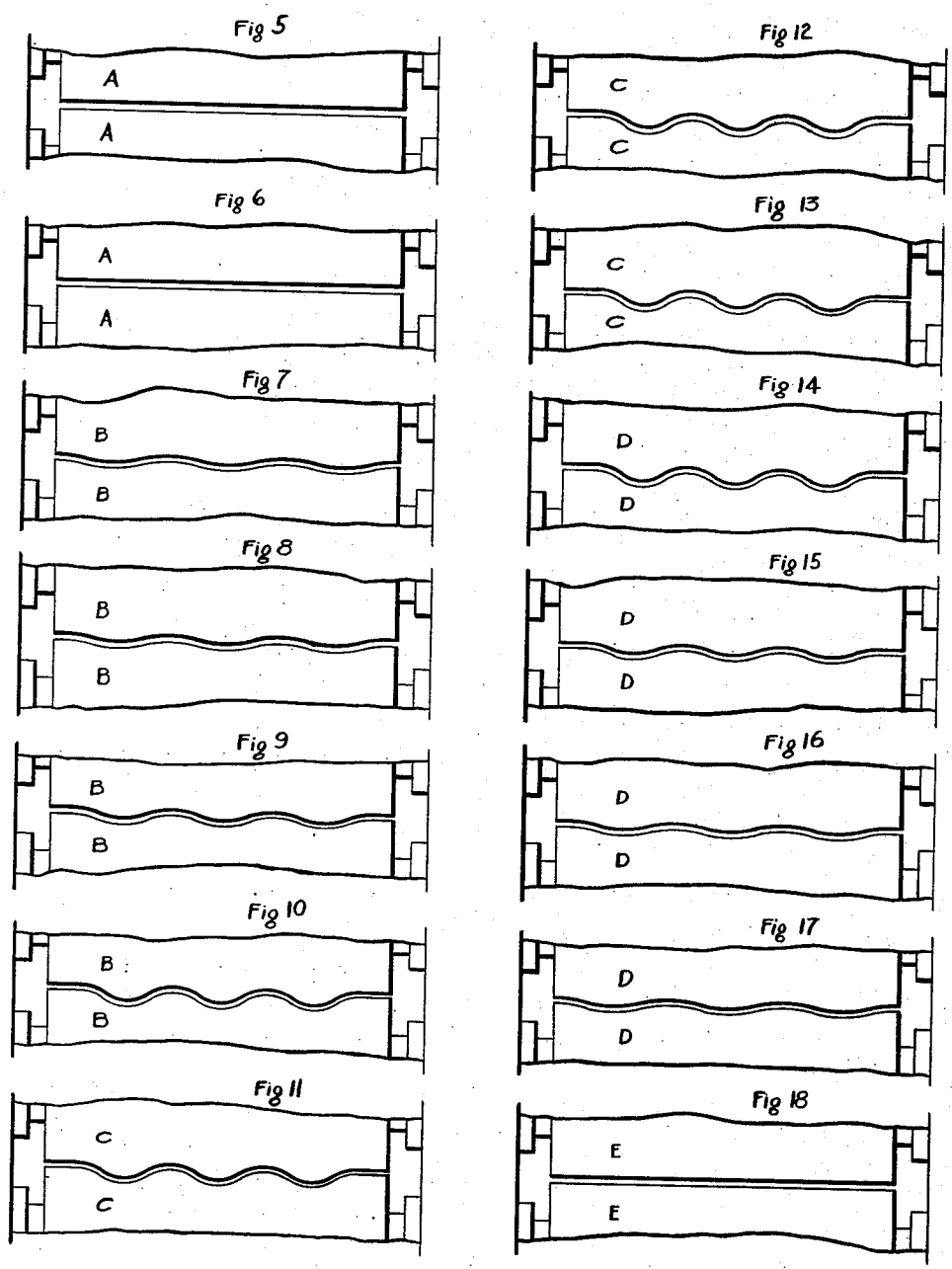

Dec. 19, 1939.　　　E. W. McKINNEY　　　2,183,969
PROCESS FOR STRETCHING SHEET METAL
Filed Oct. 10, 1936　　　10 Sheets-Sheet 3

INVENTOR
ELSMERE W. McKINNEY
BY Hoodling and Krost
ATTORNEY

Dec. 19, 1939.  E. W. McKINNEY  2,183,969
PROCESS FOR STRETCHING SHEET METAL
Filed Oct. 10, 1936   10 Sheets-Sheet 5

INVENTOR
ELSMERE W. McKINNEY
BY
Woodling and Krost
ATTORNEY

Dec. 19, 1939.  E. W. McKINNEY  2,183,969
PROCESS FOR STRETCHING SHEET METAL
Filed Oct. 10, 1936   10 Sheets-Sheet 6

INVENTOR
ELSMERE W. McKINNEY
BY
ATTORNEY

Dec. 19, 1939.  E. W. McKINNEY  2,183,969
PROCESS FOR STRETCHING SHEET METAL
Filed Oct. 10, 1936  10 Sheets—Sheet 9
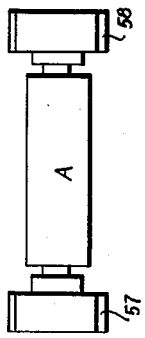
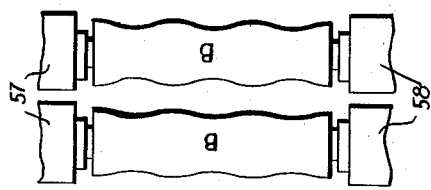
Fig 33
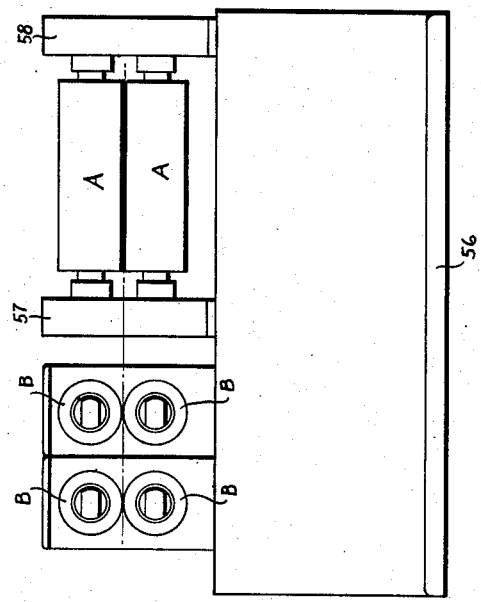
Fig 34
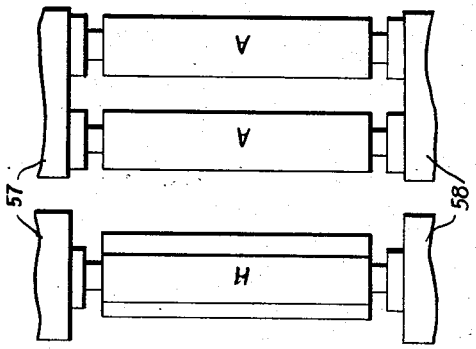
Fig 31
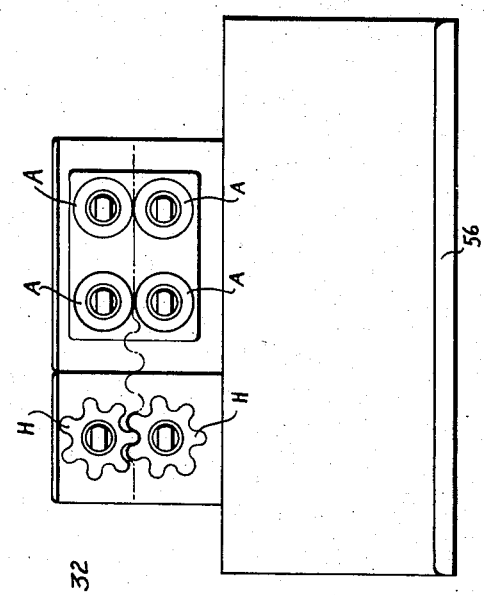
Fig 32
INVENTOR
ELSMERE W. McKINNEY
BY Woodling & Kroat
ATTORNEY INVENTOR
ELSMERE W. McKINNEY
BY Woodling and Krost
ATTORNEY Patented Dec. 19, 1939

2,183,969

UNITED STATES PATENT OFFICE 2,183,969

PROCESS FOR STRETCHING SHEET METAL

Elsmere W. McKinney, Cleveland, Ohio, assignor to The McKinney Tool and Manufacturing Company, Cleveland, Ohio, a corporation of Ohio Application October 10, 1936, Serial No. 105,053

13 Claims. (Cl. 153—54)

My invention relates to the process of stretching sheet metal and may be utilized generally to stretch sheet metal during its original manufacture or at any occasion thereafter, and particularly to reclaim deformed sheet metal.

In the fabrication of relatively large sheet metal stampings, such as the one piece all-metal tops for automobiles, fenders, and other large parts of the body, as well as other large stampings generally, there is a considerable amount of unused sheet metal pieces which constitute scrap.

In many cases, particularly in the fabrication of the one piece all-metal tops for automobiles, the unused material along the sides and ends may be as much as 6 or 7 feet long and a foot or more wide. These unused pieces of sheet material are usually deformed a great deal during the stamping operations. This results from the fact that the unused material along the sides, during the stamping operations, are clamped between holding jaws which have complementary raised and depressed portions for forming relatively large beads in the unused material in order to keep it from slipping under or between the clamping jaws. In some cases, these unused pieces and particularly the larger pieces are usually bailed and shipped back to the steel manufacturers to be again remelted and made into sheet metal strips. As is clearly manifest, this method is very expensive and in many cases prohibitive.

Therefore, an object of my invention is the process of reclaiming deformed pieces of sheet metal without shipping them back to the steel manufacturers and having them made into new sheets.

Another object of my invention is the process of reclaiming deformed sheet metal by stretching the sheet metal in its plane to take up the slack of the deformation, and then straightening the stretched sheet metal to form the reclaimed piece.

A general object of my invention is the process of stretching sheet metal by corrugating it and then de-corrugating it to form the finished piece.

Another object of my invention is the process of normalizing the stretched piece of sheet metal by heating the same to relieve it of internal stresses.

Another object of my invention is the process of stretching sheet metal by corrugating the metal longitudinally of its length, bending the corrugated sheet metal laterally of the corrugation, and de-corrugating and straightening the sheet metal to form the finished piece.

Another object of my invention is the process of stretching sheet metal by corrugating the sheet metal longitudinally of its length, and bending the corrugated sheet metal laterally of the corrugations and de-corrugating it at the same time.

Another object of my invention is the process of stretching sheet metal by passing the sheet metal through corrugated forming rolls of different elevations and then passing the sheet metal through leveller rolls to straighten the sheet metal to form the finished piece.

Another object of my invention is the process of stretching sheet metal by passing the sheet metal through corrugated forming rolls of same elevation and then passing the corrugated sheet metal through leveller rolls to form the finished sheet.

Another object of my invention is the process of stretching sheet metal by passing the sheet metal through corrugated forming rolls to form corrugations longitudinally of the length of the sheet metal, passing the corrugated sheet metal through de-corrugated rolls of different elevations to bend the sheet metal transversely of the corrugations to remove the corrugations and passing the de-corrugated sheet metal through leveller rolls to straighten the sheet metal to form the finished piece.

Another object of my invention is the process of stretching sheet metal which comprises passing the sheet metal through corrugated leveller rolls, and straightening the sheet metal to form the finished sheet.

Another object of my invention is the process of stretching sheet metal by pressing corrugations in the sheet metal, pressing the corrugated sheet metal to bend the sheet metal transversely of the corrugations, and pressing the de-corrugated sheet metal to straighten it to form the finished piece.

Another object of my invention is the process of stretching sheet metal by passing the sheet metal through transversely corrugated forming rolls to form corrugations transversely of the sheet metal and passing the corrugated metal through straightening rolls to form the finished piece.

Other objects and a fuller understanding of my invention may be had by referring to the following description, taken in conjunction with the accompanying drawings, in which like parts are designated by like reference characters, and in which:

Figure 1 is a plan view of a roll forming machine arranged to carry out the process of stretching sheet metal in accordance with my invention;

Figure 2 is a side elevational view of the roll forming machine shown in Figure 1;

Figure 3 shows a view of a deformed piece of sheet metal which may be reclaimed in accordance with the process of my invention;

Figure 4 is a view of the reclaimed piece of sheet metal shown in Figure 3;

Figure 19:
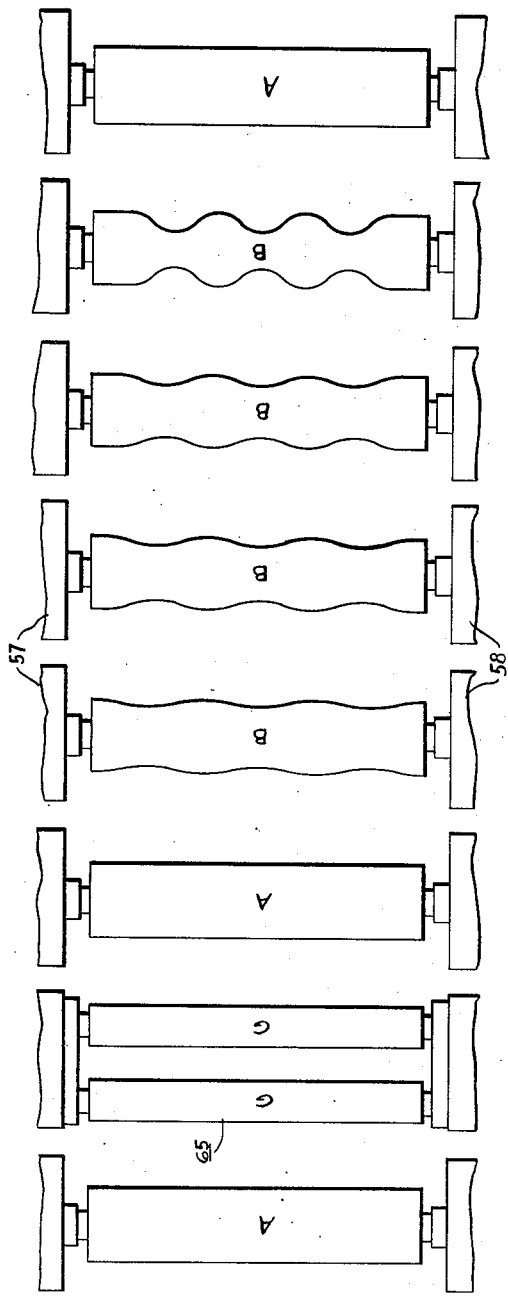
Figure 20:
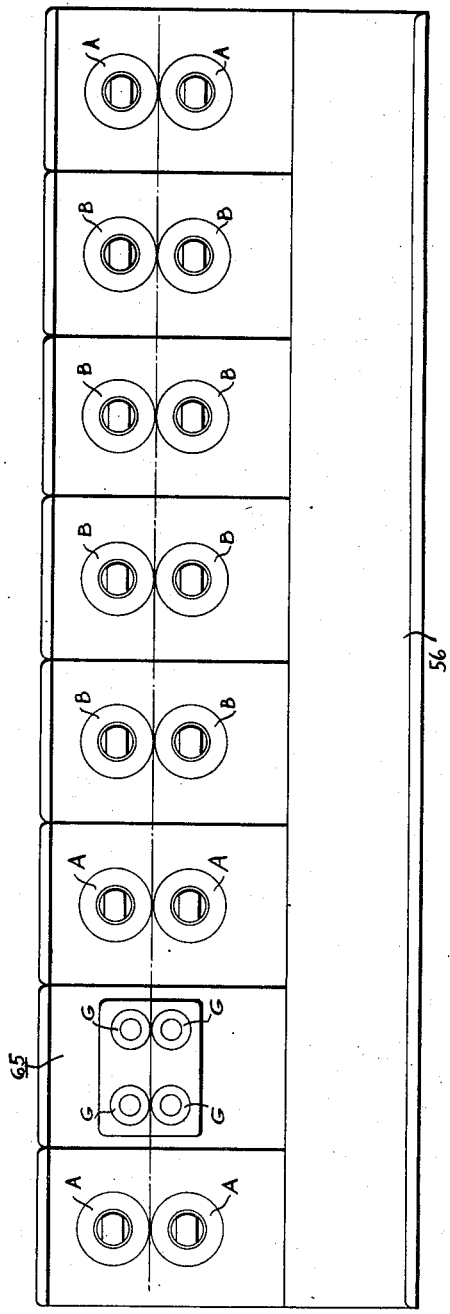

Figures 5 to 18, inclusive, show the successive passes of the sheet metal through each of the pairs of rolls in the roll forming machine shown in Figures 1 and 2, except the leveller rolls located at the finished end of the machine;

Figures 19 and 20 show respectively a plan and an elevational view of a modified arrangement of the rolls which precede the leveller rolls of the roll forming machine of Figures 1 and 2, the leveller rolls in these two views are not shown as they are the same as those shown in Figures 1 and 2.

Figure 21:
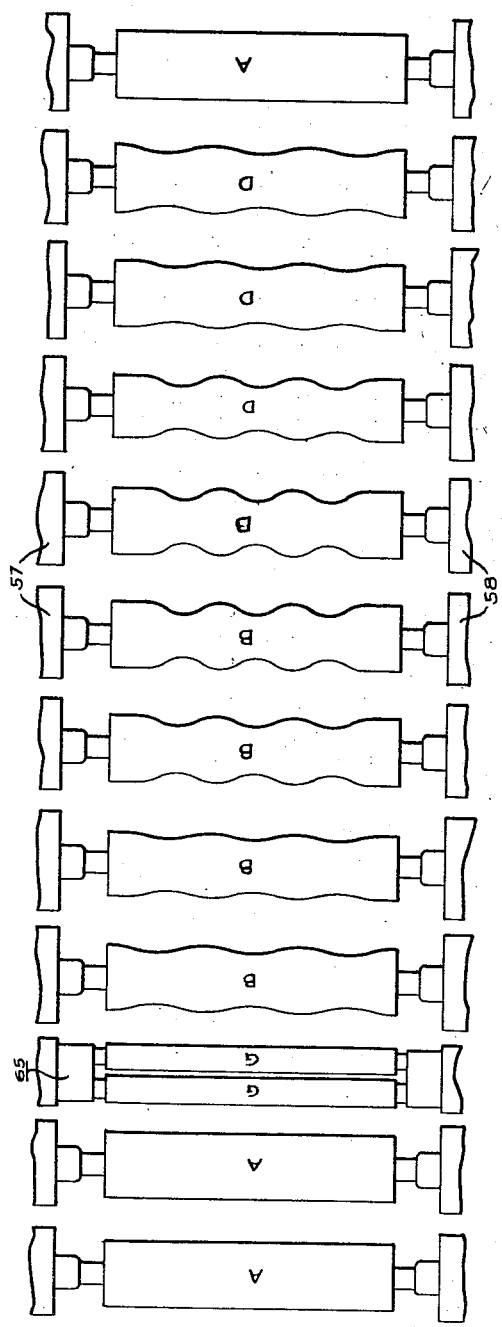
Figure 22:
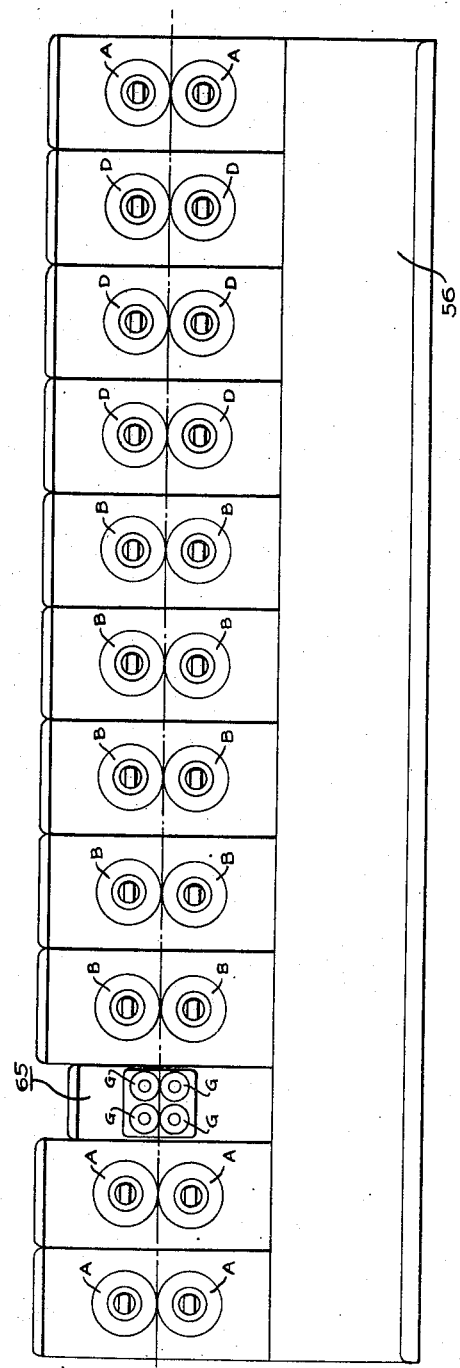

Figures 21 and 22 show respectively a plan and an elevational view of a modified arrangement of the rolls which precede the leveller rolls of the roll forming machine of Figures 1 and 2, the leveller rolls in these two figures are not shown as they are the same as those shown in Figures 1 and 2.

Figure 23:
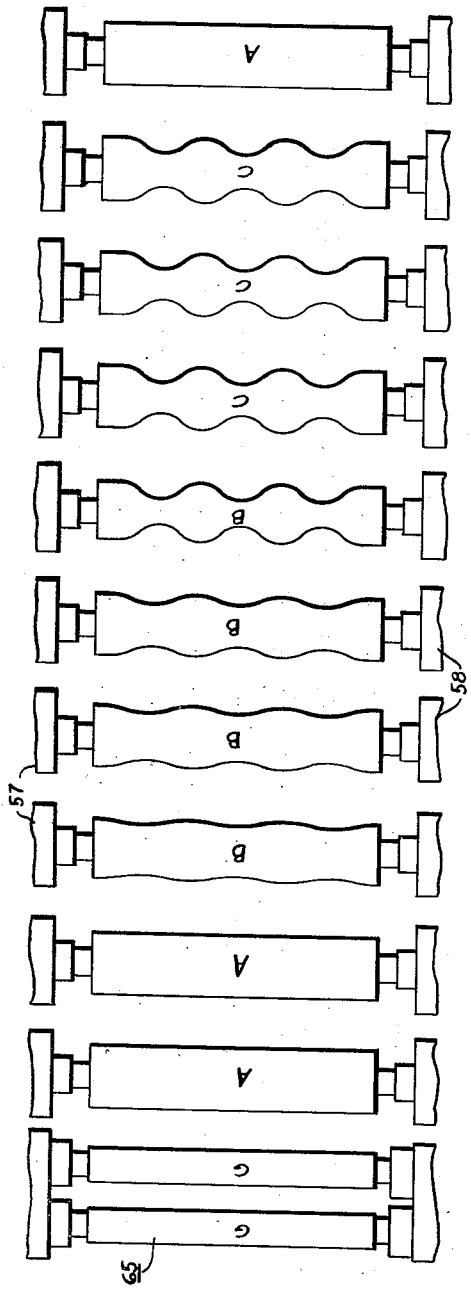
Figure 24:
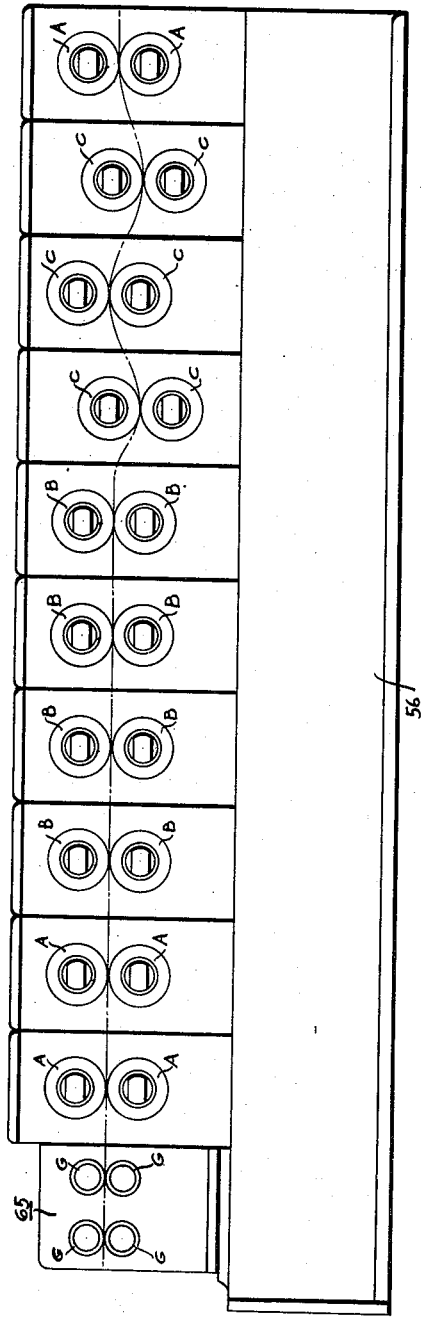

Figures 23 and 24 show respectively a plan and an elevational view of a modified arrangement of the rolls which precede the leveller rolls of the roll forming machine of Figures 1 and 2, the leveller rolls in these two views are not shown as they are the same as those shown in Figures 1 and 2.

Figure 25:
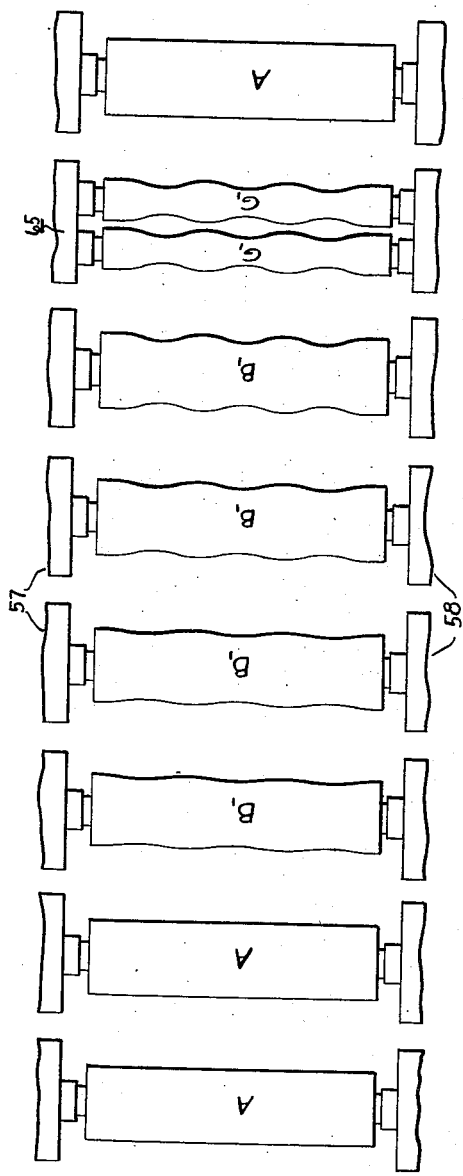
Figure 26:
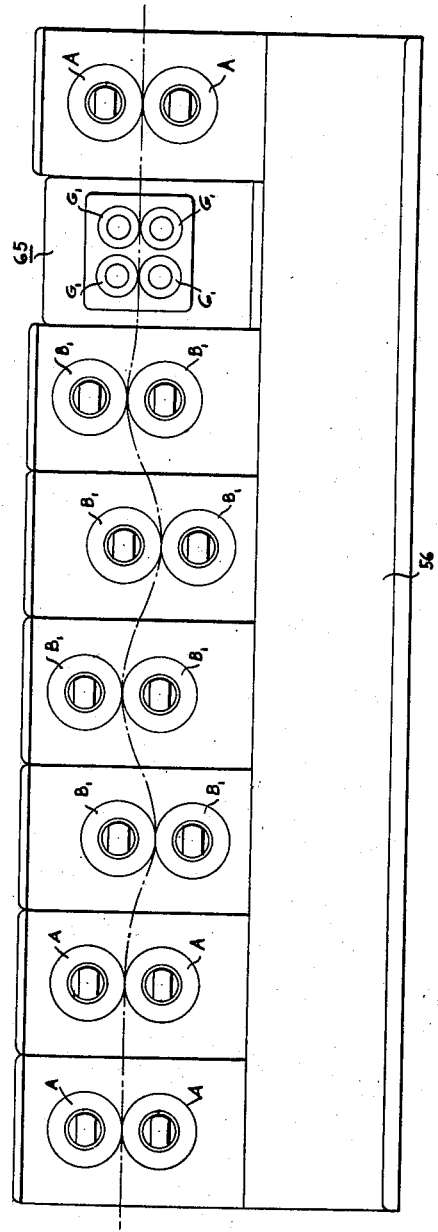

Figures 25 and 26 show respectively a plan and an elevational view of a modified arrangement of the rolls which precede the leveller rolls of the roll forming machine of Figures 1 and 2, the leveller rolls in these two figures are not shown as they are the same as those shown in Figures 1 and 2.

Figures 27, 28:
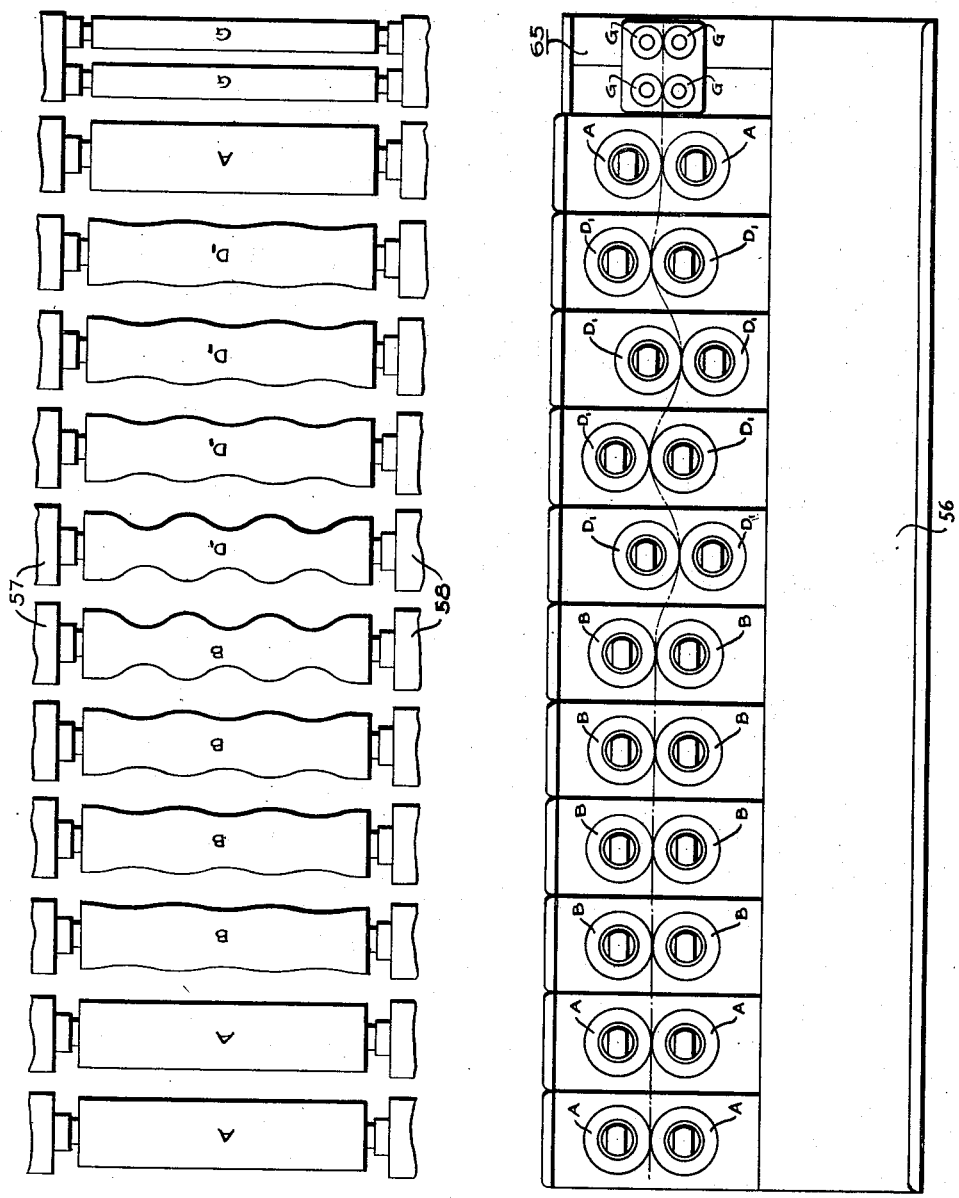

Figures 27 and 28 show respectively a plan and an elevational view of a modified arrangement of the rolls which precede the leveller rolls of the roll forming machine of Figures 1 and 2, the leveller rolls in these two figures are not shown as they are the same as those shown in Figures 1 and 2.

Figure 29:
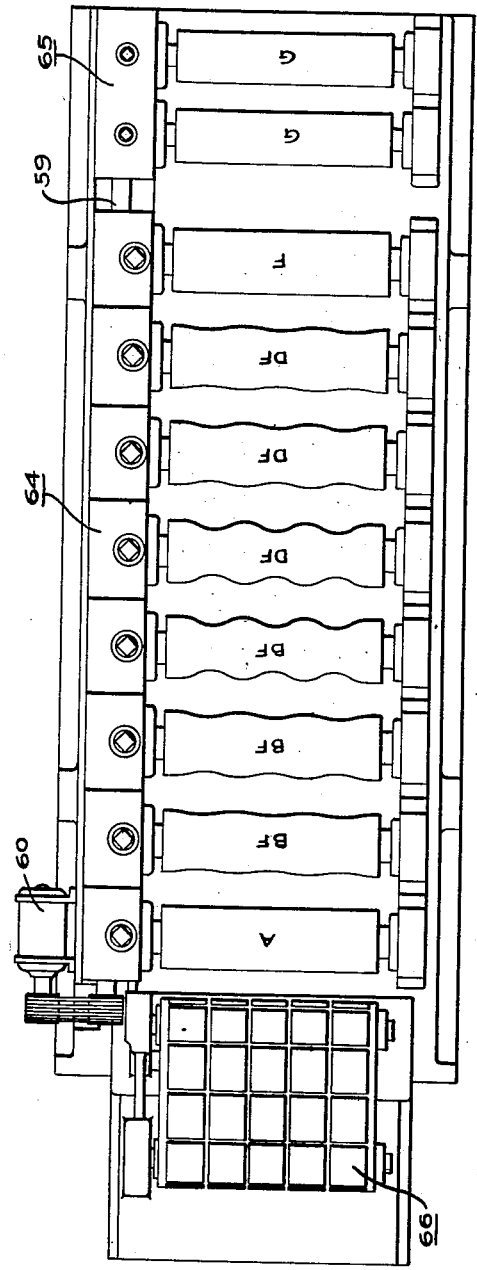
Figure 30:
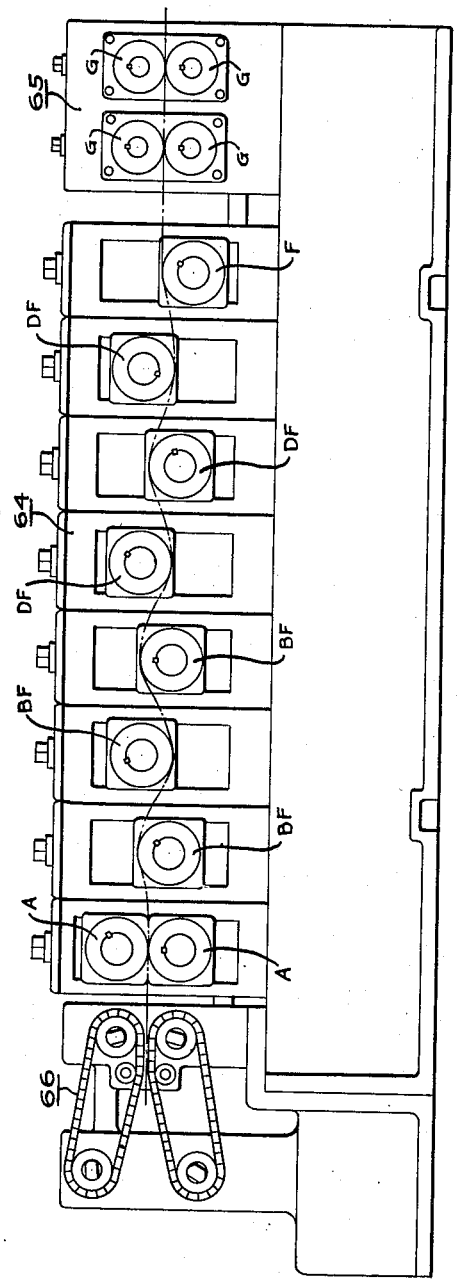

Figures 29 and 30 show respectively a plan and an elevational view of a further modified arrangement of the roll forming machine arranged to carry out the process of my invention, in that the leveller rolls themselves are corrugated.

Figure 35:
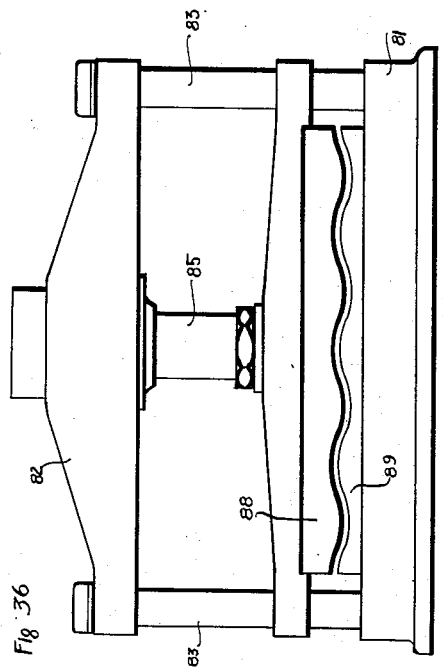
Figure 37:
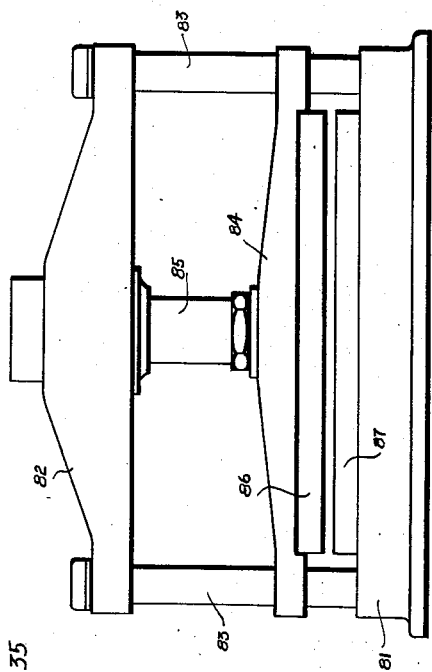
Figure 36:
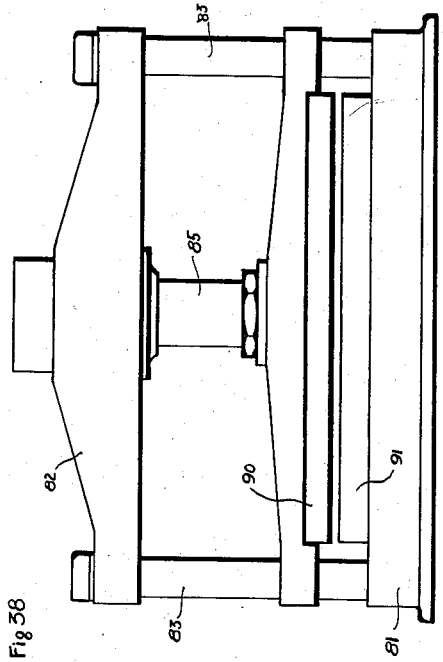
Figure 38:
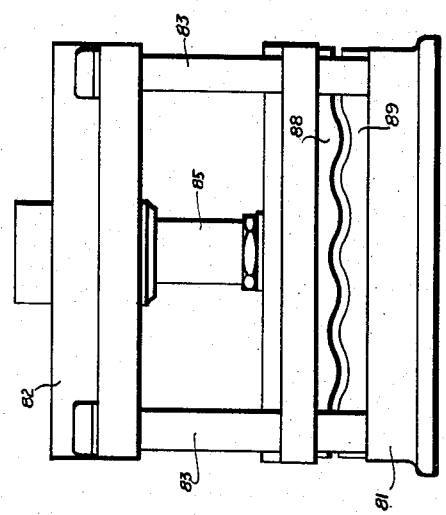

Figures 31 and 32 show respectively a plan and an elevational view of a further modified arrangement of the roll of my roll forming machine arranged to carry out the process of my invention, the leveller rolls in these two views are not shown, but they may be the same as those shown in Figures 1 and 2, Figures 33 and 34 show respectively a plan and an elevational view of a further modified arrangement of the rolls of my roll forming machine arranged to carry out the process of my invention, the leveller rolls in these two views are not shown, but they may be the same as those shown in Figures 1 and 2, Figure 35 shows an elevational view of a press machine arranged to press a piece of sheet metal, Figure 36 is a view similar to Figure 35, except that the pressing dies are corrugated to stretch the sheet metal, Figure 37 is an end view of the press shown in Figure 36 and shows the manner in which the corrugated sheet metal is bent laterally of the corrugations, and Figure 38 shows a view of a press similar to that shown in Figure 1 using flat dies to straighten the finished piece of sheet metal.

In Figure 3, I show a view of a deformed piece of sheet metal 50 which may be reclaimed by my process. This particular deformed piece of sheet metal has deformations 51, 52, 53 and 54 which may result from the stamping operations. In Figure 4, I show the reclaimed piece of sheet metal which is designated by the reference character 55. It is to be clearly understood that the shape and the deformation of the deformed piece of sheet metal in Figure 3 are merely illustrative, and that in actual practice the piece of deformed sheet metal and the deformation therein may be of a large variety. Also it must not be assumed that my process is limited to the reclaiming of deformed sheet metal. In fact, the process may be used to stretch sheet metal during the original manufacture of the sheet metal or at any occasion thereafter. Also my process of stretching the sheet metal may be utilized to correct an error in the cutting of a long strip of sheet metal which is wound upon a suitable reel. The cutting of this reel strip which may be several hundred feet long, it may be found that the width of this long strip is a fraction of an inch too narrow. In this case the long strip of sheet metal may be passed through my process and stretched sufficiently laterally to correct for the error in cutting the strip a fraction of an inch or more too narrow. In other words, my process finds general application where it becomes necessary to stretch sheet metal.

In reclaiming a deformed piece of sheet metal, one of the major problems is to remove the deformations. I find that this may be done by stretching the piece of deformed sheet metal so as to absorb the deformations. If an attempt is made to remove the deformations without stretching, there is a tendency for the deformations to retain their deformed position. However, when the sheet metal is stretched, the deformations are absorbed, that is to say, the slack of the deformation is taken up.

A roll forming machine for stretching sheet metal is shown in Figures 1 and 2. As illustrated, this roll forming machine comprises generally a base 56, having housings 57 and 58 for supporting the rolls, a longitudinal drive shaft 59 driven by the motor 60 for actuating the rolls. Any suitable means may be employed for driving the drive shaft by the motor 60, and as illustrated, the motor 60 drives a pulley 61 mounted on the left-hand end of the drive shaft 59 by means of a driving connection 62. In this manner, all of the rolls are actuated by the longitudinal drive shaft from the motor 60. The rolls may be adjusted in an elevational position by means of the adjusting arrangement 63, which is arranged to raise or lower the rolls by the turning of the top threaded screw. The reference character 64 represents the leveller rolls which are also driven by the longitudinal drive shaft 59. In the rear of the leveller rolls, I employ a normalizer indicated generally by the reference character 65. The function of the normalizer 65 is to electrically heat the metal as it passes between the two sets of rolls to relieve the metal of its internal stresses. The detailed arrangement of the manner in which the electric current is connected to the normalizer rolls is carried out in any suitable manner. Also the degree to which the metal is heated as it passes between the two sets of normalizer rolls may be adjusted to accommodate the metal being stretched for obtaining the best results.

Sometimes the deformed pieces of sheet metal are deformed a considerable amount, and for this reason I provide for utilizing an alligator feed mechanism 66 upon the entrance end of my roll forming machine. This alligator feed mechanism may comprise an upper drive roll 67 and a lower drive roll 68 and two spaced idle rolls 69 and 70 about which two converging endless treads 73 and 74 may be carried. Two intermediate rolls 71 and 72 may be placed inside of the endless tread 73 and 74 to provide a support for the endless tread when a deformed piece of sheet metal is passing therethrough. As illustrated, in Figure 1, the upper end of the alligator rolls are supported in housings 75 and 76. The driven rolls 67 and 68 of the alligator feed mechanism is driven by a drive shaft 77, which is in turn driven by the longitudinal drive shaft 59.

In Figures 1 and 2, the piece of sheet metal after it leaves the alligator feed mechanism passes through; two pair of plain pinch rolls A; four pair of corrugated rolls B of the same elevation; three pair of corrugated rolls C of different elevations; four pair of de-corrugating rolls D of the same elevation, one pair of pinch rolls A; nine staggered leveller rolls F at different elevations; and the two sets of plain normalizer rolls G. The plain pinch rolls A tend to flatten a piece of sheet metal as much as possible. The corrugated rolls B gradually corrugate the sheet metal longitudinally of its length and stretch the sheet metal to take up the slack of the deformation. When the corrugated piece of sheet metal passes through the corrugated rolls C of different elevation, the sheet metal is then bent laterally of the corrugations and further tends to stretch the sheet metal to take up the slack of the deformation. As the piece of sheet metal passes through the de-corrugating rolls D, the sheet is gradually de-corrugated, after which the piece of sheet metal passes through the plain pinch rolls A, then the piece of sheet metal passes through the leveller rolls F where it is straightened into the finished sheet. Finally the sheet metal passes through the set of rolls of the normalizer 65 where it is heated to relieve it of the internal stresses. The finished piece may then be used to make smaller stampings so that there is no waste.

The successive passes of the sheet metal through each of the pair of rolls, which precede the leveller rolls of the roll forming machine shown in Figures 1 and 2 are shown in Figures 5 to 18 inclusive. The distance between the nodal points of the corrugated rolls may be the same throughout all of the corrugated rolls, or the distance between the nodal points may be gradually reduced as the corrugations become greater. In the case where the nodal point between the corrugations are the same, there will be a tendency to laterally stretch the sheet metal which will afford additional stretching in addition to that provided when the nodal points between the corrugations are gradually decreased as the corrugations increase in depth.

In Figures 19 and 20, the sheet metal passes through one pair of plain pinch rolls A after leaving the alligator feed mechanism; then it passes through two sets of normalizer rolls G where the material is heated and the internal stresses relieved; then through one pair of pinch rolls A; and four pair of corrugated rolls B of the same elevation; and then a pair of pinch rolls A, after which the sheet metal passes through the leveller rolls F to form the finished piece of material. In this process, the normalizer rolls G heat the metal before passing through the corrugated rolls B. This process is used for metals which may be stretched enough without the aid of the corrugated rolls C and the de-corrugating rolls D.

In Figures 21 and 22, the sheet metal after passing through the alligator feed mechanism enters two pair of plain pinch rolls A; the two sets of normalizer rolls G; four pairs of corrugated rolls B of the same elevation; four pairs of de-corrugated rolls D of the same elevation; and a pair of plain pinch rolls A after which the piece of sheet metal passes through the leveller rolls F.

In Figures 23 and 24, the piece of sheet metal after passing through the alligator feed mechanism enters two sets of normalizer rolls G; two pair of plain pinch rolls A; four pair of corrugated rolls B of the same elevation; and three pair of corrugated rolls C of different elevations; and a pair of plain pinch rolls A, after which the piece of sheet metal passes through the leveller rolls F where the piece is straightened.

In Figures 25 and 26, the piece of sheet metal after passing through the alligator feed mechanism enters two pair of plain pinch rolls A; four pair of gradually increasing corrugated rolls $B_1$ of different elevations; two sets of normalizer rolls $G_1$ which are corrugated; and a pair of plain pinch rolls A, after which the piece of sheet metal passes through the leveller rolls F where the metal is straightened as the finished piece.

In Figures 27 and 28, the piece of sheet metal after passing through the alligator feed mechanism enters two pair of plain pinch rolls A; four pair of corrugated rolls B of the same elevation; four pair of gradually decreasing de-corrugated rolls $D_1$ of different elevations; one pair of plain pinch rolls A; and the two sets of normalizer rolls G after which the piece of sheet metal enters the leveller rolls F where it is straightened into a finished piece.

In Figures 29 and 30, the piece of sheet metal after passing through the alligator feed mechanism enters a pair of plain pinch rolls A; three increasingly corrugated rolls BF; three increasingly de-corrugated rolls DF; one leveller roll F; the two sets of normalizer rolls G. In the process shown in Figures 29 and 30, the piece of sheet metal is passed over and under leveller rolls which are corrugated and de-corrugated to take care of the stretching. In other words, the machine shown in Figures 29 and 30 comprises respectively, the leveller arrangement 64 of the machine shown in Figures 1 and 2, except that the rolls are corrugated and de-corrugated.

In Figures 31 and 32, the sheet metal after passing through the alligator feed mechanism enters a pair of laterally corrugated rolls H where the piece of sheet metal is corrugated laterally and then the sheet metal enters two pair of plain pinch rolls A, after which it passes through the leveller rolls F to form the finished piece. In Figures 31 and 32, the corrugations are formed laterally of the piece of sheet metal and the corrugations enter the two pair of pinch rolls A edgewise of their length.

In Figures 33 and 34, the piece of sheet metal after leaving the alligator feed mechanism enters two pair of corrugating rolls D, after which the corrugated pieces of sheet metal are introduced into one pair of pinch rolls A which is placed at right angles to the two pair of corrugated rolls D so that the corrugations enter the two pair of pinch rolls A edgewise of their length.

In Figures 35, 36, 37 and 38, I show the process of stretching the sheet metal by means of hydraulic presses. As illustrated, the presses are of similar construction, and comprise briefly, a base 81, a head 82 supported above the base 81 by means of upright members 83. The movable head 84 is hydraulically operated by a plunger 85 as is the usual practice with such presses. The press in Figure 35 is provided with an upper die 86 and a lower die 87 having a plain surface. The press in Figure 36 is similar to the press in Figure 35 but has an upper die 88 and a lower die 89 which are corrugated both lengthwise and crosswise. An end view of the corrugations of the dies 88 and 89 is shown in Figure 37. The press in Figure 38 is similar to the press in Figure 35 and has an upper die 90 and a lower die 91 of a smooth and plain surface. In stretching the sheet metal, it is first placed in the press of Figure 35 where it is pressed by the two dies 86 and 87. Then the piece of sheet metal is removed from the press 35 and put in the press illustrated in Figures 36 and 37. Here, the sheet metal is corrugated both longitudinally and laterally to stretch the sheet metal for taking up the slack of the deformation. Then, after the sheet metal is corrugated, both lengthwise and crosswise as shown in Figures 36 and 37, it is placed in the press 38 and finally straightened between the two plane dies 90 and 91.

In this application, there is shown several arrangements of the rolls to carry out the process. This is done in order that all grades and thicknesses of sheet metal may be taken care of. Thus, some sheet metal requires more working and stretching than other sheet metal, in this case they would be processed through those roll forming machines having the necessary and sufficient rolls to take up the slack and give sufficient stretching. In other cases the sheet metal may not require the same degree of stretching, in which case, it may be passed through a fewer number of rolls. Therefore, each embodiment of the process as carried out by the several showings of the roll forming machines is suited to take care of its particular need in the most economical manner.

Although I have described my invention with a certain degree of particularity, it is understood that the present disclosure has been made only by way of example and that numerous changes in the details of construction and the combination and arrangement of parts may be resorted to without department from the spirit and the scope of the invention as hereinafter claimed.

I claim as my invention:

1. The process of stretching sheet metal which comprises corrugating the sheet metal longitudinally of its length, bending the corrugated sheet metal laterally of the corrugations, de-corrugating the sheet metal, and straightening the sheet metal to form the finished piece.

2. The process of stretching sheet metal which comprises corrugating the sheet metal longitudinally of its length, bending the corrugated sheet metal laterally of the corrugations, de-corrugating the sheet metal, straightening the sheet metal to form the finished piece, and heating the sheet metal to relieve it of internal stresses.

3. The process of stretching sheet metal which comprises corrugating the sheet metal longitudinally of its length, bending the corrugated sheet metal laterally of the corrugations and de-corrugating it at the same time, and straightening the de-corrugated sheet metal to form the finished piece.

4. The process of stretching sheet metal which comprises corrugating the sheet metal longitudinally of its length and bending it laterally of the corrugations at the same time, and straightening the sheet metal to form the finished piece.

5. The process of stretching sheet metal which comprises corrugating the sheet metal longitudinally of its length and bending it laterally of the corrugations at the same time, straightening the sheet metal to form the finished piece, and heating the sheet metal to relieve it of internal stresses.

6. The process of stretching sheet metal which comprises passing the sheet metal through corrugated forming rolls of different elevations, and passing the sheet metal through leveller rolls to straighten the sheet metal to form the finished piece.

7. The process of stretching sheet metal which comprises passing the sheet metal through gradually increasing corrugated forming rolls to form corrugations longitudinally of the length of sheet metal, passing the sheet metal through corrugated rolls of different elevations to bend the sheet metal transversely of the corrugations, passing the sheet metal through gradually decreasing de-corrugating rolls to remove the corrugations, and passing the de-corrugated sheet metal through leveller rolls to straighten the sheet metal to form the finished piece.

8. The process of stretching sheet metal which comprises passing the sheet metal through corrugated forming rolls to form corrugations longitudinally of the length of the sheet metal, passing the corrugated sheet metal through de-corrugating rolls of different elevations to bend the sheet metal transversely of the corrugations and to remove the corrugations, and passing the de-corrugated sheet metal through leveller rolls to straighten the sheet metal to form the finished piece.

9. The process of stretching sheet metal which comprises pressing corrugations in the sheet metal, pressing the corrugated sheet metal to bend the sheet metal transversely of the corrugations, and pressing the de-corrugated sheet metal to straighten same to form the finished piece.

10. The process of reclaiming deformed sheet metal which comprises passing the sheet metal through corrugated rolls of different elevations, passing the corrugated sheet metal through de-corrugating rolls of different elevations, and passing the sheet metal through straight rolls to form the reclaimed piece.

11. The process of reclaiming deformed sheet metal which comprises passing the sheet metal through corrugated rolls of different elevations, passing the corrugated sheet metal through de-corrugating rolls, and passing the sheet metal through straight rolls to form the reclaimed piece.

12. The process of reclaiming deformed sheet metal which comprises passing the sheet metal through corrugated rolls, passing the corrugated sheet metal through de-corrugating rolls of different elevations, and passing the sheet metal through straight rolls to form the reclaimed piece.

13. The process of reclaiming deformed sheet metal which comprises passing the sheet metal through corrugated rolls of different elevations, passing the corrugated sheet metal through de-corrugating rolls of different elevations, passing the sheet metal through straight rolls to form the reclaimed piece, and heating the reclaimed sheet metal to relieve it of internal stresses.

ELSMERE W. McKINNEY.